(12) United States Patent
Chen (10) Patent No.: US 8,028,187 B2
(45) Date of Patent: Sep. 27, 2011

(54) DUAL-MODE COMMUNICATION APPARATUS AND POWER MANAGEMENT METHOD THEREOF

(75) Inventor: Ming-Chi Chen, Taipei County (TW)

(73) Assignee: Mediatek Inc., Hsin-Chu (TW)

( * ) Notice: Subject to any disclaimer, the term of this patent is extended or adjusted under 35 U.S.C. 154(b) by 706 days.

(21) Appl. No.: 12/173,096

(22) Filed: Jul. 15, 2008

(65) Prior Publication Data

US 2010/0017634 A1  Jan. 21, 2010

(51) Int. Cl.
*G06F 1/04* (2006.01)
(52) U.S. Cl. .................. 713/600; 713/323; 713/500
(58) Field of Classification Search .................. None
See application file for complete search history.

(56) References Cited

U.S. PATENT DOCUMENTS

| | | | |
|---|---|---|---|
| 5,526,515 A * | 6/1996 | Ross et al. | 713/500 |
| 6,029,061 A * | 2/2000 | Kohlschmidt | 455/574 |
| 7,146,182 B2 | 12/2006 | Ormson et al. | |
| 2006/0256907 A1 * | 11/2006 | Stalker et al. | 375/354 |

* cited by examiner

Primary Examiner — Dennis M Butler
(74) Attorney, Agent, or Firm — Thomas|Kayden (57) ABSTRACT

A dual-mode communication apparatus and a method thereof are provided. The dual-mode communication apparatus comprises a microprocessor, a first tick generator, a second tick generator, and an operation system tick module that comprises a tick converter and an OS tick generator. The microprocessor receives an OS clock tick to execute a real-time program task. The first tick generator receives a first predetermined number of first clocks to generate a first clock tick when the first clock is active. The second tick generator receives a second predetermined number of second clocks to generate a second clock tick when the second clock is active. The tick converter, coupled to the first and second tick generators, converts the second clock tick such that the converted second clock tick has a converted clock tick rate substantially identical to the clock tick rate of the first clock tick. The OS tick generator, coupled to the tick converter, receives the first clock tick and the converted second clock tick to generate the OS clock tick for use in the microprocessor.

14 Claims, 6 Drawing Sheets

DUAL-MODE COMMUNICATION APPARATUS AND POWER MANAGEMENT METHOD THEREOF

BACKGROUND OF THE INVENTION

1. Field of the Invention

The invention relates in general to dual mode system, and in particular, to a dual-mode communication apparatus capable of power management and a method thereof.

2. Description of the Related Art

In an embedded system, a real-time operation system (RTOS) has a timer management mechanism which provides a scheduling flexibility to every task based on an unique system timer. The tick source of this unique system timer may comprise an individual timer or several timers to generate interrupt signals on a regular basis at fixed time intervals that are short enough for the execution of real-time processing. In an embedded system for a communication application of a 2G or 3G system, the unit of the fixed time interval for the system timers is provided by a hardware timer's timing on the basis of a 2G-frame (4.615 ms) or a 3G-slot (0.667 ms), generating an OS tick at each fixed time interval.

Because low power performance is an important issue for a mobile communication system, a "power saving mode" is typically incorporated to reduce power usage in the system. Taking a 2G system as an example, the 2G clock is turned off during the power saving mode, consequently the OS tick is suspended and all system timers are withheld. When the 2G clock wakes up from the sleep mode, a sleep mode manager (SMM) informs the OS regarding the number of OS ticks that were skipped, so that the OS can update correct timing for each system timer accordingly, and restore the OS tick mechanism based on the 2G-frame.

In a dual-mode communication system where two communication systems, for example, a 2G and 3G system, operate on one communication apparatus, the OS tick is typically provided by only one communication system, for example, the 2G system. Since the two communication systems operate and enter the power saving mode by different timing, when the 3G system requires real-time OS service, the 2G system has to be waken up to provide the OS tick required for the real-time OS service request, resulting in complex clock control and increased power consumption.

Therefore, there exists a need to provide a dual-mode communication apparatus and a method for efficiently generating an OS tick for a real-time operation system in a dual-mode communication system.

BRIEF SUMMARY OF THE INVENTION

A detailed description is given in the following embodiments with reference to the accompanying drawings.

A dual-mode communication apparatus is provided, comprising a microprocessor, a first tick generator, a second tick generator, and an operation system tick module that comprises a tick converter and an OS tick generator. The microprocessor receives an operation system (OS) clock tick to execute a real-time program task. The first tick generator receives a first predetermined number of first clocks to generate a first clock tick when the first clock is active. The second tick generator receives a second predetermined number of second clocks to generate a second clock tick when the second clock is active. The operation system tick module is coupled to the first and second tick generators. The tick converter, coupled to at least one of the first and second tick generators, converts the second clock tick such that the converted second clock tick has a converted clock tick rate substantially identical to the clock tick rate of the first clock tick. The OS tick generator, coupled to the tick converter, receives the first clock tick and the converted second clock tick to generate the OS clock tick for use in the microprocessor.

According to another aspect of the invention, a method for power management of a dual-mode communication apparatus is disclosed, comprising a first tick generator receiving a first predetermined number of first clocks to generate a first clock tick when the first clock is active, a second tick generator receiving a second predetermined number of second clocks to generate a second clock tick when the second clock is active, a tick converter converting the second clock tick such that the converted second clock tick has a converted clock tick rate substantially identical to the clock tick rate of the first clock tick, and an OS tick generator receiving the first clock tick and the converted second clock tick to generate an OS clock tick for use in a microprocessor to execute a real-time program task.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
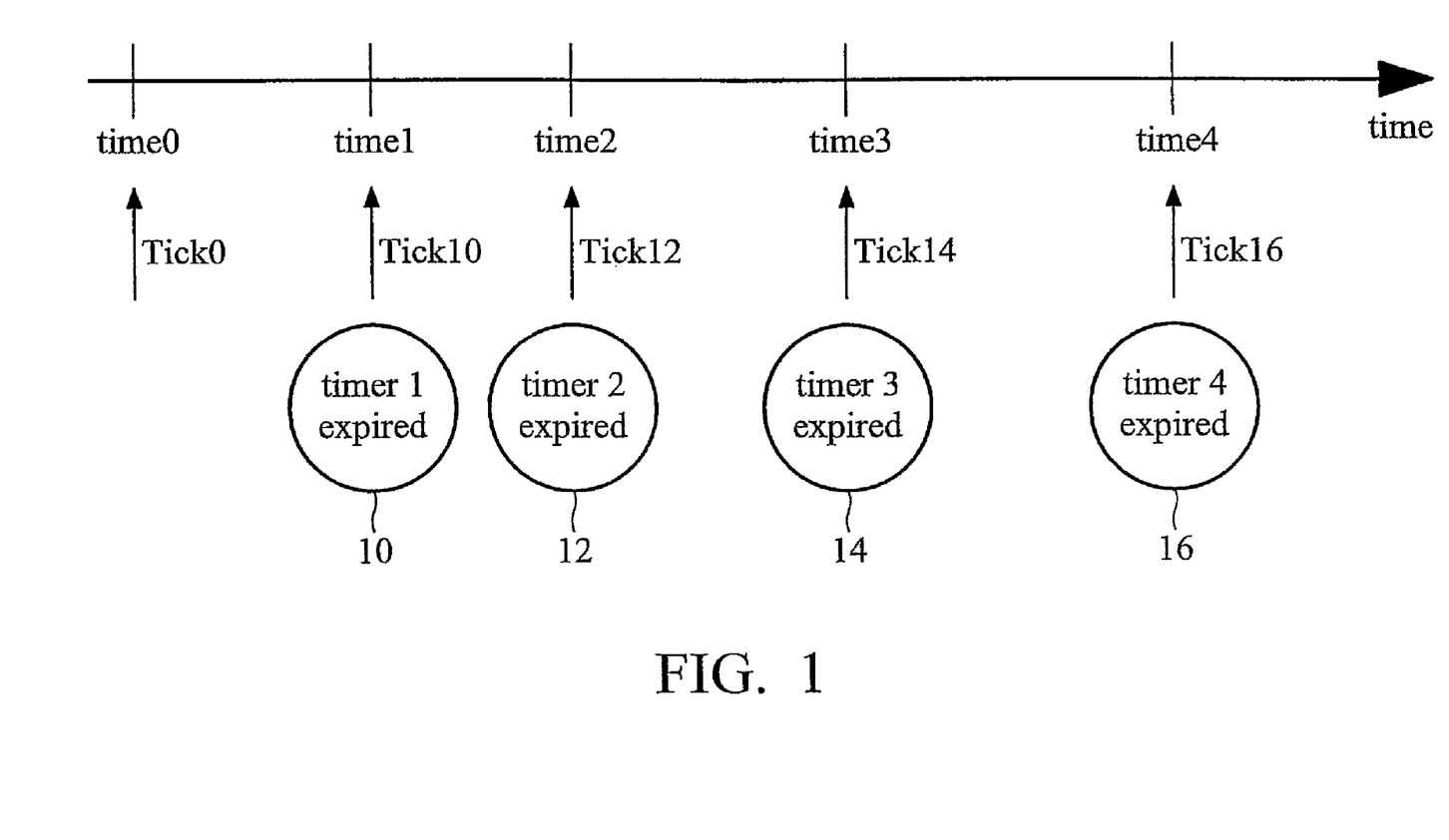
FIG. 1 is a time diagram illustrating a timer tick management scheme of a real-time operation system.

FIG. 1 is a time diagram illustrating a timer tick management scheme of a real-time operation system, where the x-axis is a time-axis, comprising 4 timeout points from time1 through time4. The time diagram illustrates one program task or several different program tasks setting up 4 system timers that time out after 4 different time durations from a reference timeout point time0. For example, the program task may set up the timeout points time1 through time4 corresponding to absolute time differences of 5 ms, 8 ms, 20 ms, and 40 ms, so that the OS system can execute a scheduled task at each timeout point. The OS system receives timer ticks from a hardware timer (not shown) to compute the timeout points for the system timers, so that when the timer 1 reaches 5 ms from a reference tick tick0, the OS system is informed by the OS tick tick10 that the timeout point time1 is completed, and the timer 2 signifies completion of the timeout point time2 after another 3 ms, the timer 3 signifies the timeout point time3 after 10 ms, and then the timer 4 signifies the timeout point timer4 after 20 ms.

In a 2G or 2.75G telecommunication system, a mobile telecommunication apparatus typically comprises a 2G modem retrieving telecommunication data from air and a microprocessor processing the telecommunication data and other program tasks. The mobile telecommunication apparatus incorporates a crystal oscillator to generate a 2G clock at 26 MHz to operate the 2G modem and to generate an OS tick every interval of a 2G frame for use in the microprocessor to tick system timers. A mobile apparatus typically acquires power from a portable power supply, thus a power management scheme is required to increase power efficiency. In one power management solution, the mobile telecommunication apparatus uses a low clock speed when inactive, referred to as a power saving mode, and uses a 2G clock speed during normal mobile apparatus operation, known as a normal operation mode. The mobile communication apparatus exits the power saving mode when receiving paging information, detects signal strength or synchronization burst broadcast from neighboring cells, or runs background applications such as screen saver, Bluetooth, and WIFI connections. In the case of a 2G system, the mobile communication apparatus exits the power saving mode to pick up paging information informing of any possible calls or messages every 0.5 to 2 seconds. The interval of the paging information pickup is defined in a broadcast control channel BCCH by a 2G network where the mobile apparatus is registered. The low clock speed is 32768 Hz, the 2G clock is a 26 MHz clock, and the 2G frame has a length of 4.615 ms.

Figure 2:
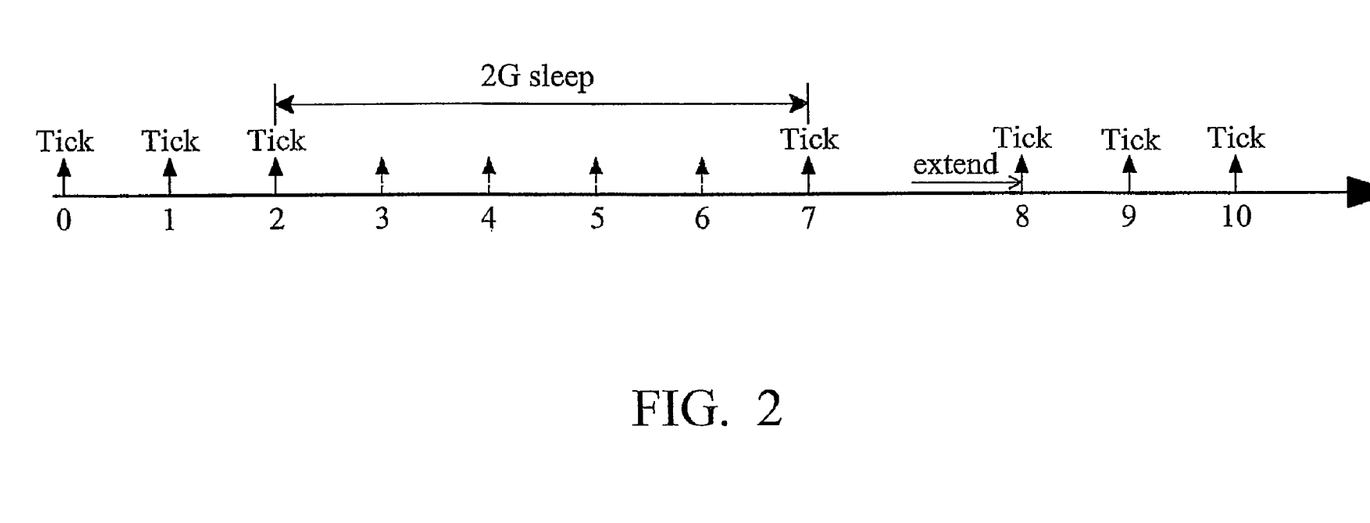
FIG. 2 is a time diagram illustrating a timer tick management scheme of a real-time OS for a second generation (2G) communication application.

FIG. 2 is a time diagram illustrating a timer tick management scheme of a real-time OS for a 2.75G communication system, where the x-axis represents time. In a normal operation mode, the 2G telecommunication apparatus employs a 2G hardware timer (not shown) to produce an OS tick every 4.615 ms, for example, the 2G hardware timer generates tick 0 though tick 2 and tick 8 though tick 10 at a fixed interval of 4.615 ms. In a power saving mode, the clock source from the crystal oscillator is turned off or gated from operation, consequently the 2G clock and the OS tick are suspended from operation, for example, the 2G hardware timer and the microprocessor system timer are suspended in the 2G sleep interval (tick 2 through tick 7), and the OS tick remains at tick 2 until the mobile telecommunication apparatus wakes up from the power saving mode. When the mobile communication apparatus exits the power saving mode to enter the normal operation mode, a sleep mode manager module (not shown) calculates the duration of the power saving mode, computes a number of skipped OS ticks during the 2G sleep interval, and restores the skipped OS tick to the microprocessor system timer, so that the 2G hardware timer can continue to tick the microprocessor system timer in the normal operation mode, and the microprocessor can execute the schedule task according to the system timer.

Figure 3:
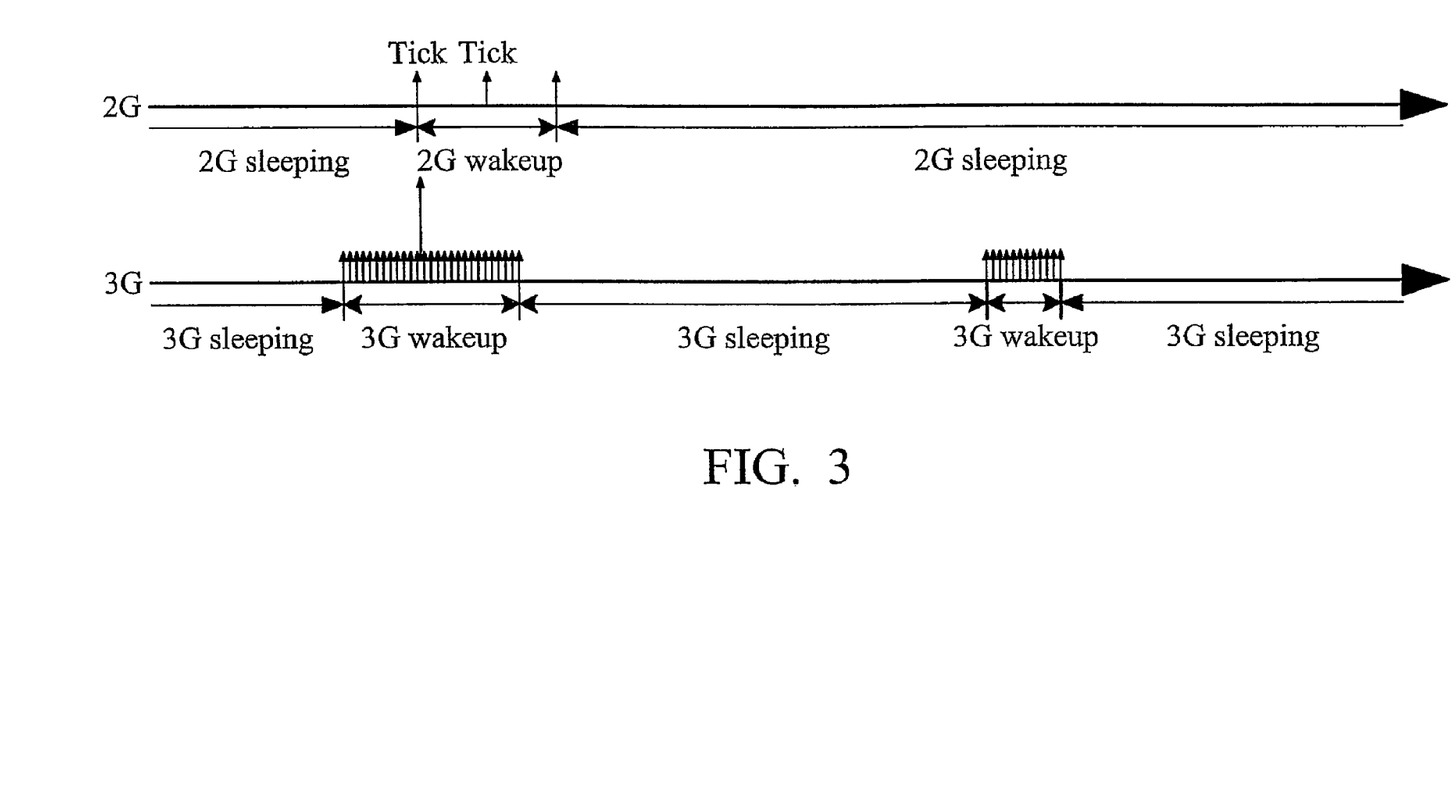
FIG. 3 show timer diagrams illustrating a timer tick management scheme of a real-time operation system for a dual-clock communication application.

In a dual-mode telecommunication system, two communication modes are integrated on a communication apparatus, wherein each communication mode has a separate hardware timer running at a separate clock speed and a separate sleep mode manager module to perform power management. For example, a 2.75G/3.5 dual-mode communication apparatus comprise a 2G hardware timer that generates an OS tick for each 2.75G frame (4.615 ms) and a 3G hardware timer that provides an OS tick for each 3.5G slot (0.667 ms). Since the 2.75G and 3.5G communication modes operate separately, they switch to the power saving mode and the operation mode according to separate power management schemes, consequently the 2.75G and 3.5G communication modes may sleep and operate at different times. However, because the OS tick is controlled by the 2G hardware timer, the OS tick can only be updated when the 2G clock is in operation. FIG. 3 shows time diagrams illustrating a timer tick management scheme of a real-time operation system for a dual-clock communication application. When the 3.5G communication mode needs to request a real-time OS service during the 3G wakeup interval and the 2.75G communication mode is in the power saving mode, the 2G clock communication mode has to be waken up (2G wakeup interval) to provide the OS ticks for the microprocessor, resulting in increased complexity of clock control and increased power consumption in the 2G clock domain.

Figure 4A:
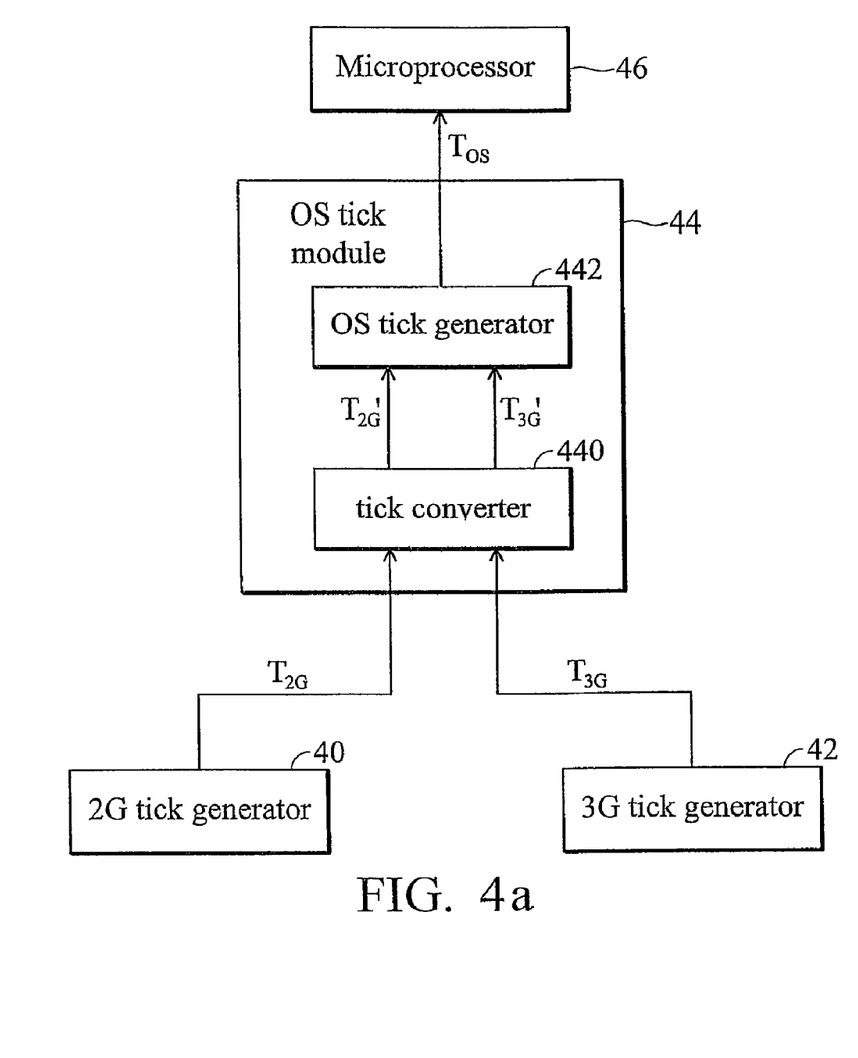
FIG. 4a is a block diagram of an exemplary dual-clock communication apparatus according to the invention.

FIG. 4a is a block diagram of an exemplary dual-clock communication apparatus according to the invention, comprising a 2G tick generator 40 (first tick generator), a 3G tick generator 42 (second tick generator), an OS tick module 44, and a microprocessor 46. The 2G tick generator 40 and the 3G tick generator 42 are coupled to the OS tick module 44, and then to the microprocessor 46. The OS tick module 44 comprises a tick converter 440 and an OS tick generator 442 coupled thereto. The tick converter 440 is coupled to the 2G tick generator 40 and the 3G tick generator 42, in some other embodiments, the tick converter only couples to one of the first and second tick generators.

The microprocessor 46 receives an OS clock tick $T_{OS}$ to execute a real-time program task, for example, screen saver, Bluetooth, WIFI applications, and 2G and 3G applications. The 2G tick generator 40 receives a first predetermined number of first clocks to generate a 2G clock tick $T_{2G}$ when the first clock is active. The 3G tick generator 42 receives a second predetermined number of second clocks to generate a 3G clock tick $T_{3G}$ when the second clock is active. For example, the first and second clocks are 2G and 3G clocks generated by a crystal oscillator (not shown) with an oscillation frequency of 13 MHz. In this embodiment, the 2G clock has a clock frequency of 26 MHz and the 3G clock has a clock frequency of 30.72 MHz. The first and second predetermined numbers are selected such that the first and 3G clock tick $T_{3G}$'s occupy substantially identical timing durations. The 2G clock tick $T_{2G}$ has a period of a 2G frame length (4.615 ms), and the 3G clock tick $T_{3G}$ has a period of a 3G slot length (0.667 ms). The tick converter 440 converts the 3G clock tick $T_{3G}$ such that the converted 3G clock tick $T_{3G}'$ has a converted clock tick rate substantially identical to the clock tick rate of the 2G clock tick $T_{2G}$. In this embodiment, one 2G frame equals to approximately 6.92 3G slot, or 13 2G frames equals to 90 3G slots. For example, the tick converter 440 converts the clock tick rate by generating one 3G clock tick $T_{3G}'$ every seven 3G clock ticks (one tick every 4.669 ms), and the generation of every $13^{th}$ 3G clock tick $T_{3G}'$ only counts six original 3G clock ticks. The converted clock tick rate of the 3 G clock tick $T_{3G}'$ is almost identical to the clock tick rate of the 2G clock tick $T_{2G}$ (one tick every 4.615 ms). The OS tick generator 442 receives the 2G clock tick $T_{2G}$ and the converted 3G clock tick $T_{3G}'$ to generate the OS clock tick $T_{OS}$ for use in the microprocessor.

The 2G tick generator 40 comprises a first counter receiving the first predetermined number of the first clocks to establish a first count as the 2G clock tick $T_{2G}$. The 3G tick generator 42 comprises a second counter receiving the second predetermined number of the second clocks to establish a second count as the 3G clock tick $T_{3G}$. Upon initialization of the mobile communication apparatus, the 3G tick generator 42 latches onto the second clock with the first clock to establish a common starting tick for the 2G and 3G clock ticks. For example, the tick converter 440 bypasses $T_{2G}$ and $T_{3G}$ to the OS tick generator 442, and generate a common starting tick by aligning a 3G clock tick with a closest 2G clock tick. Then the tick converter 440 converts the 3G clock tick $T_{3G}$ into $T_{3G}'$ to simulate the 2G clock ticks, and the OS tick generator 442 compares $T_{2G}'$ and $T_{3G}'$, then assigns one of $T_{2G}'$ and $T_{3G}'$ to be the OS clock tick $T_{OS}$. In some embodiments, the OS tick generator 442 compares the tick count of the two clock ticks $T_{2G}'$ and $T_{3G}'$, and assigns the clock tick with a larger count number.

The 2G tick generator 40 synchronizes the first clocks with a 2G system clock of a 2G communication network where the communication apparatus is registered, and increments the 2G clock tick $T_{2G}$ by one clock tick when the 2G synchronization causes delay of one clock tick in the 2G clock tick $T_{2G}$. Likewise, the 3G tick generator 42 also synchronizes the second clocks with a 3G system clock of a 3G communication network of registration, and increments the 3G clock tick $T_{3G}$ by one clock tick when the 3G synchronization causes delay of one clock tick in the 3G clock tick $T_{3G}$.

The tick converter 440 may further converts the 2G clock tick $T_{2G}$, such that the converted 2G and 3G clock ticks have converted clock tick rates substantially identical to each other, and the OS tick generator 442 receives the converted 2G and 3G clock ticks to generate the OS clock tick $T_{OS}$. For example, the tick converter 440 may convert the clock tick rate of the 2G tick by generating one converted 2G clock tick $T_{2G}'$ every thirteen 2G clock ticks (one $T_{2G}'$ tick every 59.995 ms), and it may also convert the clock tick rate by generating one converted 3G clock tick $T_{3G}'$ every ninety 3G clock ticks (one $T_{3G}'$ tick every 60.03 ms), such that the both converted clock tick rates are substantially identical to 60 ms.

Figure 4B:
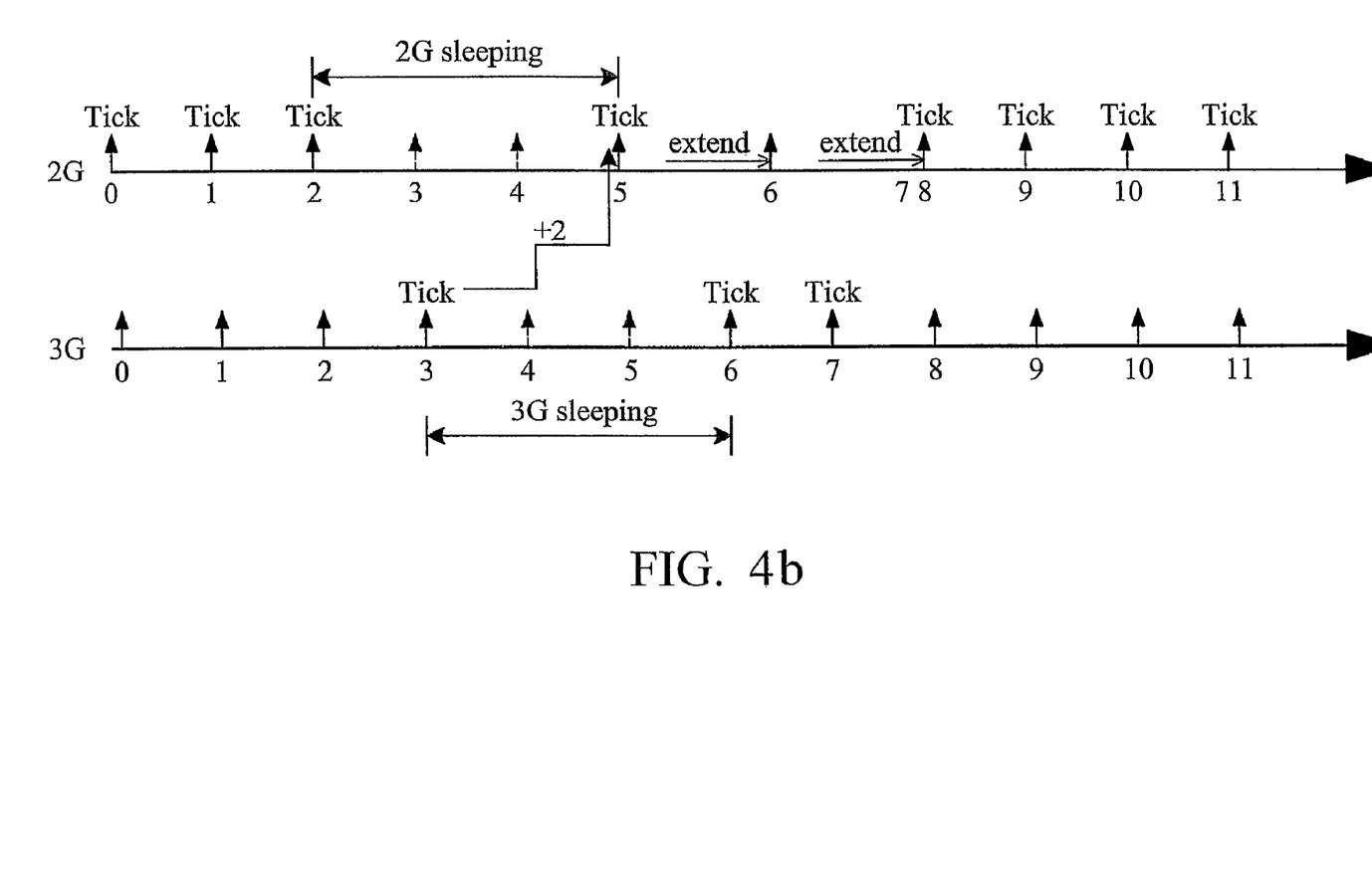
FIG. 4b show timer diagrams illustrating a timer tick management of a real-time operation system for a dual-clock communication application according to the invention.

FIG. 4b shows timer diagrams illustrating a timer tick management scheme of a real-time operation system for a dual-clock communication application according to an embodiment. The time diagrams show converted clock ticks generated at the 2G and 3G domains, the clock ticks are generated at a substantially identical tick rate, i.e., a fixed interval between two adjacent clock ticks.

In the very beginning of the timeline for the 2G and 3G domains, the 3G generator latches onto a 2G clock with a 3G clock to establish a common starting tick tick 0 for both the 2G and 3G domains at a substantially identical time. The latch error for starting ticks tick 0 on the 2G and 3G times is less than a 3G slot (i.e. around 0.667 ms). The OS clock tick $T_{OS}$ can be ticked by either the 2G or the 3G clock tick, and is indicated by the word "Tick" on top of tick arrows. At tick 2, the 2G domain enters the power saving mode and the 3G domain continues to operate and produces tick 3. The OS tick generator 442 receives the converted 2G clock tick $T_{2G}'$ at tick 2 and the converted 3G clock tick $T_{3G}'$ at tick 3, determines the 3G clock tick $T_{3G}'$ arrives earlier than the 2G clock tick $T_{2G}'$, generates the OS clock tick $T_{OS}$ according to the converted 3G clock tick $T_{3G}'$ and sets the OS clock tick $T_{OS}$ to be at the tick 3. At tick 3, the 3G domain also enters the power saving mode, so that both the 2G and 3G clocks are gated and the OS clock tick $T_{OS}$ is suspended at tick 3. At tick 5, the 2G domain wakes up while the 3G domain is still asleep, the OS tick generator 442 receives the converted 2G clock tick $T_{2G}'$ at tick 5 and the converted 3G clock tick $T_{3G}'$ at tick 3, determines the 2G clock tick $T_{2G}'$ arrives earlier than the 3G clock tick $T_{3G}'$, generates the OS clock tick $T_{OS}$ according to the converted 2G clock tick $T_{2G}'$ and sets the OS clock tick $T_{OS}$ to be at tick 5. At tick 6, the 3G clock wakes up and the 3G clock tick $T_{3G}'$ changes to tick 6, the 2G clock tick $T_{3G}'$ remains at tick 5 after synchronization with the 2G network clock, the OS tick generator 442 determines the 3G clock tick $T_{3G}'$ arrives earlier than the 2G clock tick $T_{2G}'$, generates the OS clock tick $T_{OS}$ according to the converted the 3G clock tick $T_{3G}'$ and sets the OS clock tick $T_{OS}$ to the tick 6. When the converted the 3G clock $T_{3G}'$ ticks into tick 7, the 2G clock tick $T_{2G}'$ synchronizes with the 2G network clock and remains at the tick 6 as a consequence, the OS tick generator 442 again determines the 3G clock tick $T_{3G}'$ arrives earlier than the 2G clock tick $T_{2G}'$, thus generates the OS clock tick $T_{OS}$ according to the converted the 3G clock tick $T_{3G}'$ and sets the OS clock tick $T_{OS}$ to tick 7. After two synchronizations, the 2G clock tick $T_{2G}'$ has been delayed for 1 tick, thus, at the time the OS tick generator 442 determines whether the 2G clock tick $T_{2G}'$ is earlier, the 2G tick generator 40 increments the 2G clock tick $T_{2G}'$ by 1. Therefore, OS tick generator 442 generates the OS clock tick $T_{OS}$ according to the converted 2G clock tick $T_{2G}'$ and sets the OS clock tick $T_{OS}$ to tick 8.

Figure 5:
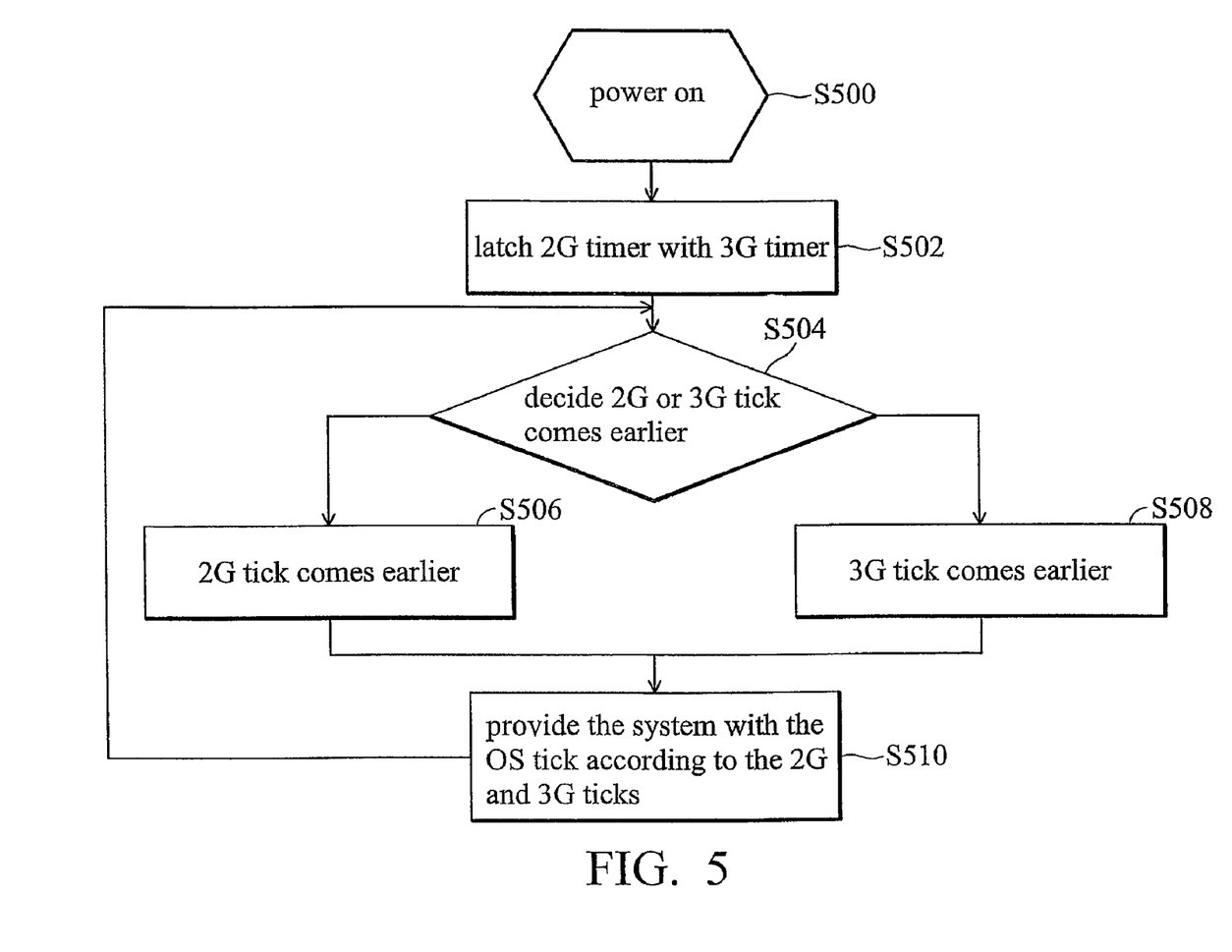
FIG. 5 is a flowchart of an exemplary method for providing real-time OS ticks in a dual-clock communication apparatus according to the invention.

FIG. 5 is a flowchart of an exemplary method for providing real-time OS ticks in a dual-clock communication apparatus according to the invention, incorporating the dual-clock communication apparatus in FIG. 4a.

Upon power on (S500), the 3G tick generator 42 latches onto the 3G clock with the 2G clock to establish a common starting tick tick 0 for the 2G and 3G clock ticks (S502). The latch operation aligns two clock ticks, so that both the 2G and 3G clock ticks can carry out clock ticking from the common start tick tick 0. The latch error between the two clock ticks may be a 3G slot, i.e., 0.667 ms, which is much less than the resolution of the OS clock tick.

After the tick converter 440 converts the 2G or 3G clock tick to an identical clock tick rate, the OS tick generator 442 receives the converted clock ticks $T_{2G}'$ and $T_{3G}'$ to decide an earlier clock tick therebetween in step S504. The OS tick generation method goes to step S506 if the 2G clock tick $T_{2G}'$ arrives at the OS tick generator 442 earlier, and step S508 if otherwise.

In step S506, the OS tick generator 442 determines the 2G clock tick $T_{2G}'$ has arrived earlier than the 3G clock tick $T_{3G}'$, and uses the 2G clock tick $T_{2G}'$ to generate the OS clock tick $T_{OS}$ in step S510. The OS tick generator 442 generates the OS clock tick $T_{OS}$ by assigning the 2G clock tick $T_{2G}'$ to be the OS clock tick $T_{OS}$, or incrementing the clock tick count of the OS clock tick $T_{OS}$ until the 2G clock tick $T_{2G}'$ and the OS clock tick $T_{OS}$ are identical.

In step S508, the OS tick generator 442 determines the 3G clock tick $T_{3G}'$ has arrived earlier than the 2G clock tick $T_{2G}'$, and uses the 3G clock tick $T_{3G}'$ to generate the OS clock tick $T_{OS}$ in step S510. The OS tick generator 442 generates the OS clock tick $T_{OS}$ by assigning the 3G clock tick $T_{3G}'$ to be the OS clock tick $T_{OS}$, or incrementing the clock tick count of the OS clock tick $T_{OS}$ until the 3G clock tick $T_{3G}'$ and the OS clock tick $T_{OS}$ are identical.

Upon the generation of the OS clock tick $T_{OS}$, the microprocessor 46 can receive OS clock tick $T_{OS}$ to process OS tasks at a scheduled time. The clock tick generation method in FIG. 5 allows the OS clock tick $T_{OS}$ to be provided by the 2G or 3G clock domains, so that the microprocessor 46 can update the OS clock tick $T_{OS}$ when at least one of the 2G and 3G clocks are turned on, reducing system complexity and power consumption.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A dual-mode communication apparatus, comprising:
    a microprocessor, receiving an operation system (OS) clock tick to execute a real-time program task;
    a first tick generator, receiving a first predetermined number of first clocks to generate a first clock tick when a first clock is active;
    a second tick generator, receiving a second predetermined number of second clocks to generate a second clock tick when a second clock is active; and
    an operation system tick module, coupled to the first and second tick generators, comprising:
        a tick converter, coupled to at least one of the first and second tick generators, converting the second clock tick such that the converted second clock tick has a converted clock tick rate substantially identical to the clock tick rate of the first clock tick; and
        an OS tick generator, coupled to the tick converter, receiving the first clock tick and the converted second clock tick to generate the OS clock tick for use in the microprocessor.

2. The dual-mode communication apparatus of claim 1, wherein the tick converter further converts the first clock tick, such that the converted first and second clock ticks have converted clock tick rates substantially identical to each other, and the OS tick generator receives the converted first and second clock ticks to generate the OS clock tick.

3. The dual-mode communication apparatus of claim 1, wherein the first tick generator comprises a first counter receiving the first predetermined number of the first clocks to establish a first count as the first clock tick, the second tick generator comprises a second counter receiving the second predetermined number of the second clocks to establish a second count as the second clock tick, and the OS tick generator compares the first clock tick with the converted second clock tick, and assigns the larger of the first clock tick and the converted second clock tick to be the OS clock tick.

4. The dual-mode communication apparatus of claim 1, wherein the first tick generator further synchronizes the first clocks with a system clock of a communication network where the communication apparatus is registered, and increments the first clock tick by one clock tick when the synchronization causes delay of one clock tick in the first clock tick.

5. The dual-mode communication apparatus of claim 1, wherein the first and second predetermined numbers are selected such that the first and second clock ticks occupy substantially identical timing durations.

6. The dual-mode communication apparatus of claim 1, wherein the second tick generator further latches onto the second clock with the first clock to establish a common starting tick for the first and second clock ticks.

7. The dual-mode communication apparatus of claim 1, wherein the first clocks are compliant with a 2G (second generation) telecommunication system, the second clocks are compliant with a 3G (third generation) telecommunication system, the first clock tick has a period of a 2G frame length, and the second clock tick has a period of a 3G slot length.

8. A method of power management of a dual-mode communication apparatus, comprising:
    a first tick generator receiving a first predetermined number of first clocks to generate a first clock tick when a first clock is active;
    a second tick generator receiving a second predetermined number of second clocks to generate a second clock tick when a second clock is active;
    a tick converter converting the second clock tick such that the converted second clock tick has a converted clock tick rate substantially identical to the clock tick rate of the first clock tick; and
    an OS tick generator receiving the first clock tick and the converted second clock tick to generate an OS clock tick for use in a microprocessor to execute a real-time program task.

9. The method of claim 8, further comprising the tick converter converting the first clock tick, such that the converted first and second clock ticks have converted clock tick rates substantially identical to each other, and the OS tick generator receives the converted first and second clock ticks to generate the OS clock tick.

10. The method of claim 8, wherein the first tick generator receiving step comprises a first counter receiving the first predetermined number of the first clocks to establish a first count as the first clock tick, the second tick generator receiving step comprises a second counter receiving the second predetermined number of the second clocks to establish a second count as the second clock tick, and the OS tick generator receiving step comprises the OS tick generator comparing the first clock tick with the converted second clock tick, and assigning the larger of the first clock tick and the converted second clock tick to be the OS clock tick.

11. The method of claim 8, further comprising the first tick generator synchronizing the first clocks with a system clock of a communication network where the communication apparatus is registered, and incrementing the first clock tick by one clock tick when the synchronization causes delay of one clock tick in the first clock tick.

12. The method of claim 8, wherein the first and second predetermined numbers are selected such that the first and second clock ticks occupy substantially identical timing durations.

13. The method of claim 8, further comprising the second tick generator latching onto the second clock with the first clock to establish a common starting tick for the first and second clock ticks.

14. The method of claim 8, wherein the first clocks are compliant with a 2G telecommunication system, and the second clocks are compliant with a 3G telecommunication system, the first clock tick has a period of a 2G frame length, and the second clock tick has a period of a 3G slot length.

* * * * *